United States Patent
Yi et al.

(10) Patent No.: US 9,531,816 B2
(45) Date of Patent: Dec. 27, 2016

(54) METHOD AND APPARATUS FOR MEDIA TRANSFER BETWEEN USER EQUIPMENT

(75) Inventors: Qiang Yi, Beijing (CN); Hui Jin, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 293 days.

(21) Appl. No.: 13/584,371

(22) Filed: Aug. 13, 2012

(65) Prior Publication Data

US 2012/0311026 A1    Dec. 6, 2012

Related U.S. Application Data

(63) Continuation of application No. PCT/CN2011/070504, filed on Jan. 24, 2011.

(30) Foreign Application Priority Data

Feb. 11, 2010 (CN) .......................... 2010 1 0111665

(51) Int. Cl.
H04W 36/00    (2009.01)
H04L 29/08    (2006.01)
H04L 29/06    (2006.01)

(52) U.S. Cl.
CPC ......... *H04L 67/148* (2013.01); *H04L 65/1016* (2013.01); *H04L 65/1063* (2013.01);
(Continued)

(58) Field of Classification Search
CPC .... H04L 67/14; H04L 67/148; H04L 65/1083; H04L 65/1089
(Continued)

(56) References Cited

U.S. PATENT DOCUMENTS 7,979,558 B2 *   7/2011  Mahdi .......................... 709/227
8,032,589 B2 *  10/2011  Foti .............................. 709/203
(Continued)

FOREIGN PATENT DOCUMENTS

CN    101383827 A    3/2009
CN    101494648 A    7/2009
(Continued)

OTHER PUBLICATIONS

"23.237 Change Request 0224; S2-095420—Allowing any UE to Request IUT," 3GPP TSG SA WG2 Meeting #75, Aug. 31-Sep. 4, 2009, Current Version 9.1.0, 3GPP, Valbonne, France.
(Continued)

*Primary Examiner* — Aaron Strange
(74) *Attorney, Agent, or Firm* — Leydig, Voit & Mayer, Ltd.

(57) ABSTRACT

A method and apparatus for transferring media between user equipment are provided. In one embodiment, the method comprises: receiving a pull mode media transfer request initiated by the initiator user equipment, wherein the pull mode media transfer request comprises session identifier information that identifies a session associated with the media transfer; determining whether the target continuity application server is a controlee continuity application server; and when the session associated with the media transfer is a collaborative session and the target continuity application server is determined to be a controlee continuity application server, forwarding the pull mode media transfer request to a controller continuity application server that performs the media transfer. The technical solutions of the present invention may be applicable to various cases that may occur in the media transfer operation and ensures session continuity.

13 Claims, 5 Drawing Sheets

(52) U.S. Cl.
CPC ...... *H04L 65/1083* (2013.01); *H04L 65/1089* (2013.01); *H04L 65/1093* (2013.01); *H04L 67/14* (2013.01); *H04W 36/0005* (2013.01)

(58) Field of Classification Search
USPC .......................................................... 709/203
See application file for complete search history.

(56) References Cited

U.S. PATENT DOCUMENTS

| | | | | |
|---|---|---|---|---|
| 8,072,970 | B2* | 12/2011 | Ricciardi et al. ............. | 370/356 |
| 8,385,903 | B2* | 2/2013 | Ghai .................. | H04L 65/1083 455/414.2 |
| 9,103,468 | B2* | 8/2015 | Li .......................... | F16L 9/006 |
| 9,318,152 | B2* | 4/2016 | Kretz ...................... | G11B 27/11 |
| 2008/0275966 | A1 | 11/2008 | MacKinnon | |
| 2009/0257433 | A1* | 10/2009 | Mutikainen et al. ......... | 370/392 |
| 2009/0305733 | A1 | 12/2009 | Xu ................................ | 455/466 |
| 2012/0137008 | A1* | 5/2012 | Atarius ........................ | 709/227 |

FOREIGN PATENT DOCUMENTS

| | | |
|---|---|---|
| CN | 101848512 A | 9/2010 |
| EP | 2093946 A1 | 8/2009 |
| JP | 2009044314 A | 2/2009 |

OTHER PUBLICATIONS

Written Opinion of the International Searching Authority in corresponding PCT Patent Application No. PCT/CN2011/070504 (May 26, 2011).

International Search Report in corresponding PCT Patent Application No. PCT/CN2011/070504 (May 26, 2011).

Search report issued in corresponding European patent application No. EP11741853.3, dated Apr. 27, 2012, 11 pages total.

3GPP TR 23.831 V0.1.0;Technical Specification Group Services and System Aspects; IP Multimedia Subsystem(IMS) Service Continuity; Inter-UE Transfer enhancements; Stage 2 (Release ,3rd Generation Partnership Project(3GPP),Mobile Competence Centre;650,Route des Lucioles;F-06921 Sophia-Antipolis Cedex ; France ,vol. SA WG2,no.Shenzhen; Jan. 18, 2010, Jan. 12, 2010(Jan. 12, 2010) ,XP050432678,[retrieved on Jan. 12, 2010] 28 pages total.

"Digital cellular telecommunications system (Phase 2+); Universal Mobile Telecommunications System(UMTS);LTE;IP multimedia Subsystem (IMS) Service Continuity;Stage 2(3GPP TS 23.237 version 9.3.0 Release 9)",Technical Specification,European Telecommunications Standards Institute (ETSI),650,Route des Lucioles;F-06921 Sophia-Antipolis; France,No. V9.3.0, Jan. 1, 2010(Jan. 1, 2010) ,XP014045261, 92 pages total.

"3GPP TR 23.831 V0.2.0; Technical Specification Group Service and System Aspects ; IP Multimedia Subsystem (IMS)Service Continuity; Inter-UE Transfer enhancements; Stage 2( Release 10)", 3GPP Standard ; 3GPP TR 23.831,3rd Generation Partnership Project (3GPP) ,Mobile Competence Centre; 650,Route des Lucioles; F-06921 Sophia-Antipolis Cedex;France, No. V0.2.0, Feb. 10, 2010(Feb. 10, 2010) , pp. 1-42,XP050401883, 42 pages total.

Qualcomm Incorporated:"Multiple SCC AS handling",3GPP Draft; S2-100190_Multiple SCC_AS-04,3rd Generation Partnership Project (3GPP) ,Mobile Competence Centre; 650,Route des Lucioles; F-06921 Sophia-Antipolis Cedex; France, vol. SA WG2 ,no.Shenzhen; Jan. 18, 2010, Jan. 12, 2010 (Jan. 12, 2010),XP050432791,[retrieved on Jan. 12, 2010] , 6 pages total.

"3rd Generation Partnership Project ; Technical Specification Group Services and System Aspects; IP Multimedia Subsystem (IMS) Service Continuity; Inter-UE Transfer enhancements; Stage 2(Release 10)", Mar. 9, 2010 (Mar. 9, 2010) ,3GPP Standard; 3GPP TR 23.831,3rd Generation Partnership Project (3GPP) ,Mobile Competence Centre;650,Route des Lucioles; F-06921 Sophia-Antipolis Cedex;France,pp. 1-61,XP050401924[retrieved on Mar. 9, 2010], 62 pages total.

"3rd Generation Partnership Project; Technical Specification Group Core Network and Terminals; IP Multimedia (IM) Core Network (CN) subsystem inter-UE transfer enhancements; Stage 3 (Release 10)", Jul. 12, 2010 (Jul. 12, 2010),3GPP Standard; 3GPP TR 24.837,3rd Generation Partnership Project (3GPP) ,Mobile Competence Centre; 650,Route des Lucioles;F-06921 Sophia-Antipolis Cedex; France ,pp. 1-57,XP050442006,[retrieved on Jul. 12, 2010], 58 pages total.

\* cited by examiner

FIG. 5

METHOD AND APPARATUS FOR MEDIA TRANSFER BETWEEN USER EQUIPMENT

This application is a continuation of International Patent Application No. PCT/CN2011/070504, filed on Jan. 24, 2011, which claims priority to Chinese Patent Application No. 201010111665.1, filed on Feb. 11, 2010, both of which are incorporated herein by reference in their entireties.

FIELD OF THE INVENTION

The present invention relates to communication technologies, and in particular, to a method and apparatus for media transfer between user equipment.

BACKGROUND OF THE INVENTION

An IP multimedia subsystem (IP Multimedia Subsystem, IMS for short) is an IP-based multimedia service communication network. An IMS network uses an IMS core network subsystem (IP Multimedia Core Network Subsystem) to perform service control, and a packet-switched network or a circuit-switched network is used as an access network to provide bearers for signaling and media transmission. Thereby, service control is separated from bearers, and a unified and flexible support platform is provided for IP multimedia applications.

When an IMS user moves between different access networks, in order to ensure a good user experience, it is required that the ongoing IMS session should not be interrupted, that is, the IMS session continuity (Session Continuity, SC for short) should be maintained. Similarly, when the user transfers some or all media streams of the ongoing IMS session from a user equipment (User Equipment, UE for short) to another UE, in order to provide a good user experience, it is also required that the media streams of the session should be continued and not interrupted in the transfer process. Service continuity implemented for some or all media streams of the IMS session in an inter-UE transfer (Inter-UE Transfer, IUT for short) process is a part of the IMS session continuity.

One certain end of a session may include one or multiple UEs. When one end includes multiple UEs and the multiple UEs communicate with a same UE at the remote end, sessions of the multiple UEs form a collaborative session. Among the multiple UEs in the collaborative session, there may be one or multiple controller UEs (controller UE) and one or multiple controllee UEs (controllee UE). The controller UE may control the UEs in the collaborative session and the media streams on those UEs. In the collaborative session, media streams may be transferred from one UE to another UE, or transferred to a UE outside the collaborative session, and the UE joins the collaborative session after completion of transfer.

A service centralization and continuity application server (Service Centralization and Continuity Application Server, SCC AS for short) is a key function entity in the IMS session continuity system, interacts with an IMS user through a serving call session control function entity (Serving Call Session Control Function, S-CSCF for short), and performs a core SC service logic control For easy description, the service centralization and continuity application server is referred to as continuity application server for short in the present invention. In a process of registering with the IMS domain, the IMS user further performs third-party registration with the SCC AS that the UE belongs to, and IMS users under different subscriptions may belong to different SCC ASs.

In the collaborative session, each UE may have multiple access legs (access leg) presented through the SCC AS that the UE belongs to, and the multiple access legs are anchored to the SCC AS of the controller UE, and a remote leg (remote leg) is presented to the remote end. The SCC AS that the controller UE belongs to is referred to as a controller SCC AS, and the SCC AS that the controllee UE belongs to is referred to as a controllee SCC AS. The controller SCC AS stores information about each UE and media on each UE in the collaborative session. The media transfer mode in which a UE transfers media on other UEs to the UE itself by sending a request is referred to as a "pull mode", that is, a pull mode. The UE that sends the request may be a controllee UE in the collaborative session, or may be a UE outside the collaborative session.

In a session discovery (session discovery) phase of the UE, if a certain discovered target UE is a controllee UE in the collaborative session, and the controllee UE and the controller UE are UEs under different subscriptions and belong to different SCC ASs, after a pull mode media transfer request is sent to the SCC AS that the target UE belongs to, an media transfer operation cannot be completed because the controllee SCC AS is not authorized to transfer media. Therefore, the prior art is limited as to the media transfer operation between UEs, and cannot ensure the session continuity reliably.

SUMMARY OF THE INVENTION

Embodiments of the present invention provide a method and apparatus for media transfer between user equipment.

An embodiment of the present invention provides a method for transferring media between an initiator user equipment and a target user equipment performed by a target continuity application server to which the target user equipment belongs, comprising: receiving a pull mode media transfer request initiated by the initiator user equipment, wherein the pull mode media transfer request comprises session identifier information that identifies a session associated with the media transfer; determining whether the target continuity application server is a controlee continuity application server; and when the session associated with the media transfer is a collaborative session and the target continuity application server is determined to be a controlee continuity application server, forwarding the pull mode media transfer request to a controller continuity application server that performs the media transfer, wherein: the controllee continuity application server is a continuity application server to which a controlee user equipment in the collaborative session belongs, and the controller continuity application server is a continuity application server to which a controller user equipment in the collaborative session belongs.

Another embodiment of the present invention provides a target continuity application server for transferring media between an initiator user equipment and the target user equipment, comprising: a receiving module configured to receive a pull mode media transfer request initiated by the initiator user equipment, wherein the pull mode media transfer request comprises session identifier information that identifies a session associated with the media transfer; and a forwarding module configured to forward, when the session associated with the media transfer is a collaborative session and the target continuity application server determines itself to be a controlee continuity application server, the pull mode media transfer request to a controller continuity application server that performs the media transfer; wherein: the controllee continuity application server is a continuity application server to which a controlee user equipment in the collaborative session belongs, and the controller continuity application server is a continuity application server to which a controller user equipment in the collaborative session belongs.

DETAILED DESCRIPTION OF THE EMBODIMENTS

In order to make the objectives, technical solutions and advantages of the present invention clearer, the present invention is hereinafter described in detail with reference to the accompanying drawings and embodiments. The exemplary embodiments and descriptions of the embodiments of the present invention are used to illustrate the present invention, but the present invention is not limited thereto.

In a session implemented by an IMS network, one of the main features is as follows: In an IUT process, not only a controller UE may transfer media to a controllee UE actively, but also the controllee UE may also transfer media on the controller UE or other controllee UEs in the collaborative session to the controllee UE itself, or a UE outside the collaborative session initiates a pull mode media transfer request to transfer the media in the collaborative session to the UE and join the collaborative session, thus enhancing the IUT function. The session continuity topic allows transferring media to UEs under different subscriptions in REL10 phase, and allows discovering UE information belonging to different subscriptions and the session information on the UEs in the UE discovery process; likewise, for the pull mode media transfer, allows the UEs belonging to the same subscription to initiate pull mode media transfer requests, and also allows the UEs belonging to different subscriptions to initiate pull mode media transfer requests. Here, belonging to the same subscription means that the UE initiating a pull mode media transfer request and the target UE in which the media is involved belong to the same subscription.

In the session discovery phase, if the discovered target UE is a controllee UE in the collaborative session, the obtained session information is only the session information of the target UE but does not include the information about the collaborative session in which the target UE is involved. For the existing cases of the prior art, no matter whether the UE initiating media transfer is in the collaborative session, no matter whether the pull mode media transfer request is initiated to the controller UE or to the controllee UE, and no matter whether the initiator UE, controllee UE, and controller UE belong to a same SCC AS, the technical solutions of the embodiments of the present invention may implement pull mode media transfer and ensure the session continuity.

Embodiment 1

Figure 1:
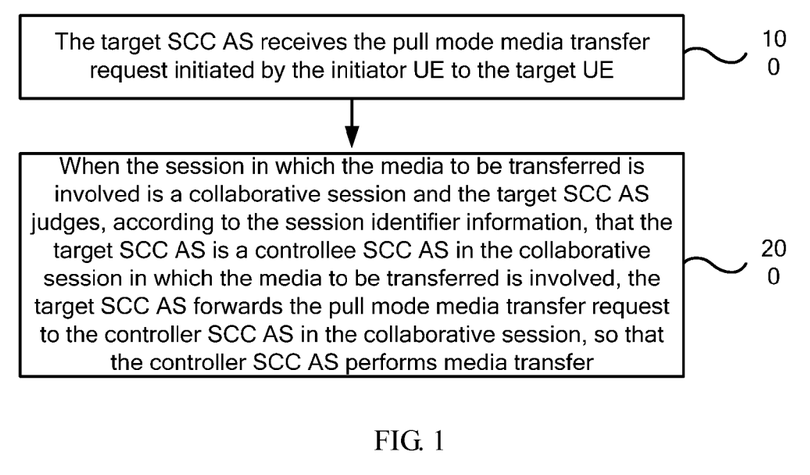
FIG. 1 is a flowchart of a method for media transfer between user equipment according to a first embodiment of the present invention.

FIG. 1 is a flowchart of a method for media transfer between user equipment according to a first embodiment of the present invention. For clear description, the names are defined as follows: The SCC AS that the controller UE of a collaborative session belongs to is named a controller SCC AS; the SCC AS that the controllee UE belongs to is named a controllee SCC AS; the UE that initiates a pull mode media transfer operation is named an initiator UE; the SCC AS that the initiator UE belongs to is named an initiator SCC AS; the source UE in which transferred media is involved is named a target UE, and the SCC AS that the target UE belongs to is named a target SCC AS. The above naming differentiates UEs and SCC ASs from different perspectives. In practical applications, the initiator UE may also be a controllee UE in the collaborative session, and the initiator SCC AS, target SCC AS, and controller SCC AS may also be the same SCC AS. Different UEs may belong to a same subscription and a same SCC AS, and may also belong to different subscriptions and different SCC ASs.

Before requesting to perform media transfer, first the initiator UE discovers session information on the target UE in the session discovery process, where the discovered target UE may be a controller UE in the collaborative session, and may also be a controllee UE in the collaborative session. The discovered session information includes session identifier information (session-ID) of each session that the discovered target UE joins, media type, and the like. The initiator UE determines to transfer one or multiple pieces of media to the initiator UE itself according to the above information.

The method for media transfer between UEs in this embodiment specifically includes the following steps:

Step 100: The target SCC AS receives the pull mode media transfer request initiated by the initiator UE to the target UE, and the target SCC AS terminates sending of the pull mode media transfer request to the target UE.

In step 100, the target SCC AS is the SCC AS that the target UE belongs to, and the pull mode media transfer request includes session identifier information, where the session identifier information is used to identify the session in which media to be transferred on the target UE is involved, specifically, the session identifier information of the session between the target UE and the target SCC AS. The pull mode media transfer request may further include other information, for example, the initiator UE identifier and the target UE identifier.

In the IMS network, the pull mode media transfer request may be sent by the S-CSCF of the initiator UE to the initiator SCC AS of the initiator UE by using initial filter criteria (Initial Filter Criteria, iFC for short). The intermediate network element that the message transmitted between the UE and the SCC AS needs to pass through is not described repeatedly here.

In step 100, receiving, by the target SCC AS, the pull mode media transfer request from the initiator UE specifically includes: judging, by the SCC AS that receives the pull mode media transfer request, according to the target UE identifier in the media transfer request, whether the target UE belongs to the SCC AS itself; if yes, determining that the SCC AS itself is the target SCC AS and proceeding to the subsequent step 200; and if not, sending the pull mode media transfer request according to the target UE identifier until the target SCC AS receives the pull mode media transfer request from the initiator UE. That is, the pull mode media transfer request is based on the target UE identifier, and may be forwarded to the target SCC AS through multiple hops. Because the request is a media transfer request of the pull mode, the request is terminated after arriving at the target SCC AS. The SCC AS performs the media transfer operation without a need of sending the request to the target UE.

Step 200: When the session in which the media to be transferred is involved is a collaborative session, and the target SCC AS judges, according to the session identifier information, that the target SCC AS itself is a controllee SCC AS in the collaborative session in which the media to be transferred is involved, the target SCC AS forwards the pull mode media transfer request to the controller SCC AS in the collaborative session, so that the controller SCC AS performs media transfer, where the controller SCC AS is the SCC AS that the controller UE in the collaborative session belongs to.

In specific applications, each SCC AS may judge, according to the session identifier information in the pull mode media transfer request and the information about the collaborative session stored by the SCC AS, whether the SCC AS itself is a controller SCC AS.

When the target SCC AS judges that the SCC AS itself is a controller SCC AS, the target SCC AS serving as the controller SCC AS may directly perform the media transfer operation. This is a simple case that the controller UE serves as a target UE or the target UE and the controller UE belong to the same SCC AS.

While the target SCC AS forwards the pull mode media transfer request to the controller SCC AS, the target SCC AS may further convert the session identifier information between the target UE and the target SCC AS, which is included in the pull mode media transfer request, into the session identifier information between the target SCC AS and the controller SCC AS.

In step 200, the target SCC AS is a controllee SCC AS and needs to convert the session identifier information. The reason for changing the session identifier information lies in that: the controllee SCC AS, serving as a back to back user agent (back to back User Agent, B2BUA for short) when the controllee UE creates media, sends signaling to the controller SCC AS. Therefore, in the access leg of the controllee UE, the session between the controllee UE and the controllee SCC AS and the session between the controllee SCC AS and the controller SCC AS have different session identifiers, causing different session identifier information. The session identifier information in the original pull mode media transfer request is the session identifier between the controllee UE and the controllee SCC AS, and the controller SCC AS cannot match the session identifier information. Therefore, conversion is required, so that the controller SCC AS can match, according to the session identifier information between the controllee SCC AS and the controller SCC AS, the session in which the media to be transferred is involved.

The target SCC AS may forward the pull mode media transfer request to the controller SCC AS in multiple modes, for example, a redirection mode and a direct sending mode are included.

An invite (invite) message may be used as the pull mode media transfer request, and the pull mode is indicated by a message header in the invite message. Specifically the message header may use a content-disposition or subject message header.

When the pull mode media transfer request uses an invite message, the forwarding operation may be specifically as follows: The target SCC AS judges, according to the initiator UE identifier in the invite message, whether the initiator UE belongs to the target SCC AS itself.

If not, the invite message is redirected to the controller SCC AS. Specifically, the target SCC AS may return a redirect message with respect to the invite message sent by the initiator UE, so as to directly send the invite message to the controller SCC AS, and carry the session identifier information between the target SCC AS and the controller SCC AS in the redirect message, so that the initiator SCC AS updates the session identifier information in the invite message to the session identifier information between the target SCC AS and the controller SCC AS and directly sends the invite message to the controller SCC AS.

If yes, the invite message is sent to the controller SCC AS directly. In practical applications, even if the initiator SCC AS and the target SCC AS are not the same SCC AS, redirection may not be performed, and the target SCC AS directly forwards the pull mode media transfer request to the controller SCC AS. The redirection used in practical applications is a means of sending a pull mode media transfer request to the controller SCC AS by the initiator UE. Its merit is that in the signaling procedure performed subsequently, the forwarding process on the target SCC AS that serves as an intermediate node may be reduced.

The pull mode media transfer request may also use a refer (refer) message. In the refer message, a message header is used to instruct the initiator UE to join the current collaborative session after completion of pull mode media transfer. The header may be a refer-to (refer-to) header, which carries information that indicates joining the current collaborative session. In this mode, the transfer operation may be that the target SCC AS sends the refer message to the controller SCC AS directly, and at the same time, updates the original session identifier information in the refer message to the session identifier information between the target SCC AS and the controller SCC AS.

The mode for the target SCC AS to forward the pull mode media transfer request to the controller SCC AS includes but is not limited to the above two modes.

After the pull mode media transfer request is sent to the controller SCC AS, the controller SCC AS transfers, according to the target UE identifier, initiator UE identifier, and converted session identifier information in the pull mode media transfer request, the media to be transferred from the target UE to the initiator UE, and the step may specifically include:

judging, by the controller SCC AS, whether the initiator UE is in the current collaborative session; if not, creating a session with the initiator UE, creating media to be transferred in the newly created session, updating the remote end, releasing media on the target UE, and thus transferring the media to be transferred to the initiator UE; and if yes, creating a session with the initiator UE, creating media to be transferred in the newly created session, or adding media to be transferred in the original access leg corresponding to the initiator UE in the current collaborative session, updating the remote end, releasing media on the target UE, and thus completing the media transfer operation.

No matter whether the initiator UE is in the current collaborative session, the process of performing the media transfer operation through the newly created session by the controller SCC AS may further include: sending, by the controller SCC AS, a notification message to the initiator SCC AS, so as to notify the initiator SCC AS that the newly created session belongs to the current collaborative session and that the initiator UE is the controllee UE in the collaborative session, and notify the initiator SCC AS of the information about the controller UE in the collaborative session and/or the information about the controller SCC AS in the collaborative session, for example, address information and identity information of the controller UE and controller SCC AS, so that the initiator UE and the initiator SCC AS acquire respective identity information in the collaborative session, facilitating execution of other operations.

In the IMS network, generally Session Initiation Protocol (Session Initiation Protocol, SIP for short) signaling is used as call control signaling. The embodiment of the present invention may implement the method for media transfer between UEs based on the existing signaling message, which is described respectively in the following embodiments.

Embodiment 2

Figure 2:
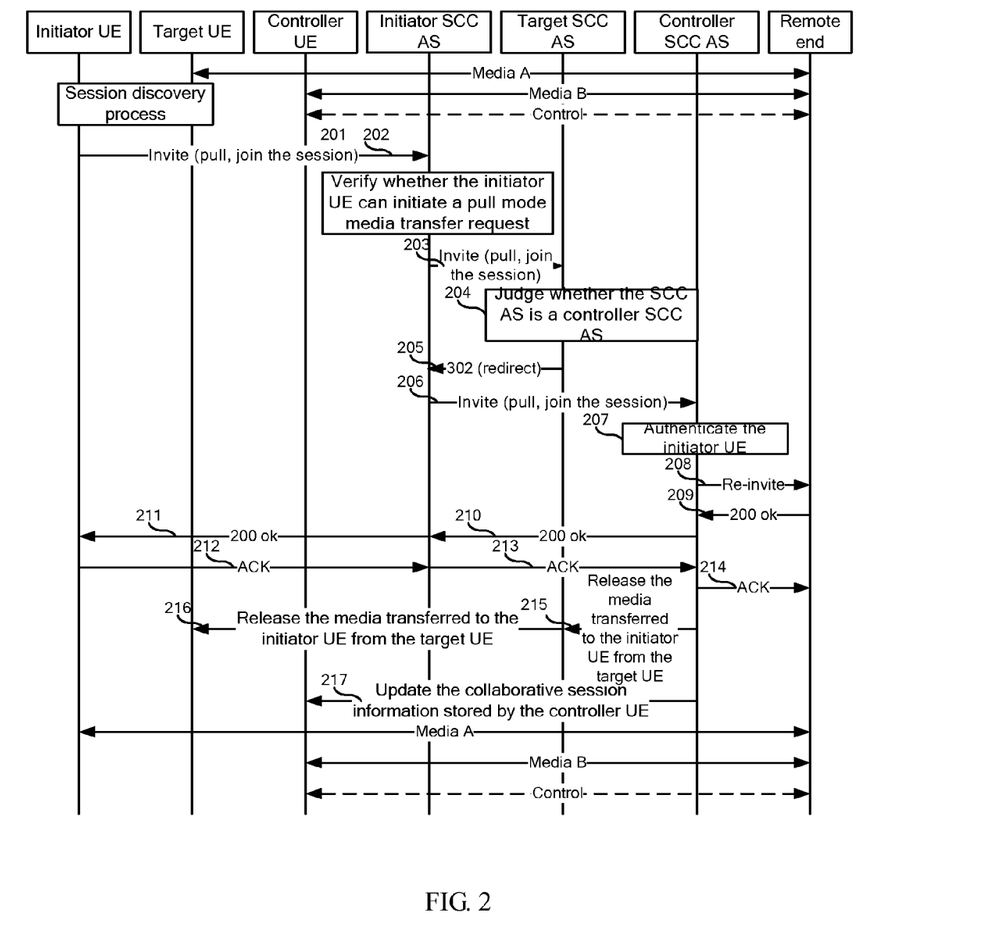
FIG. 2 is a signaling flowchart of a method for media transfer between user equipment according to a second embodiment of the present invention.

FIG. 2 is a signaling flowchart of a method for media transfer between user equipment according to the second embodiment of the present invention. This embodiment specifically uses an invite (invite) message as a pull mode media transfer request, and is applicable to the following case: The controller UE and controllee UE in the collaborative session belong to different SCC ASs; an initiator UE that does not belong to the collaborative session requests the controllee UE in the collaborative session to transfer media; and the initiator UE, the controller UE, and the controllee UE belong to different subscriptions and different SCC ASs respectively. The initiator UE obtains the information about the session and media on the target UE through the session discovery process.

The invite message is one type of SIP signaling, including multiple headers and message bodies. The method performed based on the invite message in this embodiment includes the following steps:

Step 201: The initiator UE initiates an invite message to create a session, and carries a pull mode media transfer indication in the invite message.

The invite message includes at least an initiator UE identifier, a target UE identifier, and session identifier information between the target UE and the target SCC AS. The invite message is actually sent to the initiator SCC AS first, and routed and forwarded by the network side according to the destination address. In this embodiment, the destination address of the invite message is the target UE identifier.

The invite message may carry information by using its headers and message bodies, for example, a Session Description Protocol (Session Description Protocol, SDP for short) message body, a content-disposition or subject header, a join header, a request uniform resource identifier (request Uniform Resource Identifier, request-URI for short) header, a target header, and a source header.

(1) Media line in SDP, indicating the media to be created on the initiator UE, that is, a type of the media to be transferred.

(2) Content-disposition/subject (content-disposition/subject: pull-media) header, indicating that the invite message is a pull mode media transfer request.

(3) Join (Join) header, indicating the session information on the target UE in which the media to be transferred is involved, and also indicating that the initiator UE joins the collaborative session after completion of media transfer, so as to differ from the case that an IMS session is created after media transfer. To express the above information, the join header may be specifically the session identifier information on the target UE obtained in the session discovery phase, and is specifically the session identifier information between the controllee UE and the controllee SCC AS in this embodiment. The session identifier information may be formed by a session identifier, a session source end identifier, and a session remote end identifier, for example, the specific form may be "Join:7@c.example.org;to-tag=xyz;from-tag=pdq".

(4) Request uniform resource identifier (request-URI) header, also known as a request identifier header, indicating the destination to which the invite message is sent. When the pull mode media transfer request is initiated, the destination address is the target UE identifier. Each UE may be, but is not limited to, using the URI of the UE to identify.

(5) Target header and source header, the source header being the identity information of the initiator UE, for example, "From: initiator UE URI", and the target header being the identity information of the target UE, for example, "To: controllee UE URI". Though parameters of the target header and request-URI header are consistent, the parameters have different identification functions when being parsed and identified.

Step 202: The SCC AS that receives the invite message judges, according to the destination address in the invite message, whether the SCC AS is the SCC AS that the UE, which is pointed to by the destination address, belongs to; if yes, proceeds to step 204; and if not, sends a invite message according to the destination address and performs step 203.

The invite message in this embodiment is sent to the initiator SCC AS first; because it is assumed that the initiator SCC AS and the target SCC AS are different SCC ASs, the judgment result of the initiator SCC AS at this time is no, and the invite message continues to be forwarded.

In step 202, the SCC AS that receives the invite message may identify first, according to the content-disposition/subject header of the invite message, that the invite message is a pull mode media transfer request. In this step, after the invite message is identified as a pull mode media transfer request, the initiator SCC AS may further verify whether the initiator UE is authorized to initiate a pull mode media transfer request; if yes, proceeds to subsequent step 203; and if not, returns an error response to the initiator UE, for example, a 4** response message, which is used for terminating the invite message.

Step 203: The SCC AS that receives the invite message judges, according to the destination address in the invite message, whether the SCC AS is the SCC AS that the UE, which is pointed to by the destination address, belongs to, and the operation is the same as the operation in step 201; if yes, proceeds to subsequent step 204; and if not, the invite message is sent according to the destination address until the SCC AS that the UE which is pointed to by the destination address belongs to receives the invite message from the initiator UE, that is, sent to the target SCC AS in this embodiment.

Step 204: The invite message is sent to the target SCC AS that the target UE belongs to, and the target SCC AS terminates sending of the request to the target UE when the invite message is identified as a pull mode media transfer request according to the content-disposition/subject header. Further, before the target SCC AS performs subsequent judgment logic, the target SCC AS may also authenticate with the target UE whether the initiator UE is allowed to initiate a pull mode media transfer request to the target UE.

The target SCC AS that receives the invite message judges whether the SCC AS is the controller SCC AS in the collaborative session in which the media to be transferred is involved; if yes, the SCC AS may serve as a controller UE to perform media transfer; and if not, performs step 205.

In this embodiment, because the target UE is the controllee UE, the invite message is sent to the controllee SCC AS. Therefore, the target SCC AS in step 204 serves as a controllee SCC AS, and the controllee SCC AS and the controller SCC AS are different SCC ASs; thus the judgment result is no, and proceeds to step 205.

In step 204, the SCC AS judges, according to the session identifier information included in the invite message and the collaborative session information stored by the SCC AS, whether the SCC AS is the controller SCC AS in the collaborative session.

Step 205: The target SCC AS judges, according to the initiator UE identifier in the invite message, whether the initiator UE belongs to the target SCC AS; if not, returns a redirect message, so as to instruct the initiator SCC AS that receives the redirect message to update the session identifier information in the invite message according to the redirect message, and send the updated invite message to the controller SCC AS; and if yes, the target SCC AS updates the session identifier information in the invite message and directly sends the updated invite message to the controller SCC AS.

In this embodiment, because the initiator SCC AS and the target SCC AS are not the same SCC AS, actually a redirect operation is performed in step 205, and the converted session identifier information is carried in the redirect message for sending.

The reason for updating the session identifier information in the invite message lies in that: the session identifier information in the join header of the invite message is a session identifier between the controllee UE and the controllee SCC AS; in order for the controller SCC AS to find the session that matches the session identifier, it is required to update the session identifier information in the join header to the session identifier information of the session between the controllee SCC AS and the controller SCC AS.

In step 205, a specific operation of converting the session identifier information and then carrying the converted session identifier information in the redirect message is as follows:

The redirect message may be implemented by using a 302 redirect response message (302 (redirect)). The interactive address (contact) header in the 302 redirect response message is specifically a public service identity (Public Service Identity, PSI for short) of the controller SCC AS in the collaborative session stored by the controllee SCC AS, used for indicating the destination address of redirection and instructing the initiator SCC AS that receives the redirect message to send the original invite message to the address specified by the contact header, that is, the controller SCC AS in the collaborative session.

Because the join header is not allowed to be carried in the response message, the 302 redirect response message carries the converted session identifier information through an extensible markup language (Extensible Markup Language, XML for short) message body. A specific form of the XML message body is as follows:

(1) Use the message body in the format of application/dialog-info+xml

```
Content-Type: application/dialog-info+xml
Content-Disposition: Join-session //indicating the content of the message
body
<?xml version="1.0"?>
    <dialog-info xmlns="urn:ietf:params:xml:ns:dialog-info"
                    version="1"
                    state="full"
                    entity="sip:sccas2@example.com">
        <dialog id="as7d900as8" call-id="a84b4c76e66710"
                    local-tag="1928301774" remote-tag="456887766">
//indicating the session identifier information of a join session
            <state>confirmed</state>
        </dialog>
    </dialog-info>
```

(2) Newly define a message body in the xml format for the join session (Join session)

```
Xml schema:
<?xml version="1.0"?>
<xs:schema targetNamespace="urn:3gpp:ns:imsiut:join"
    xmlns:join="urn:3gpp:ns:imsiut:join"
    xmlns:xs="http://www.w3.org/2001/XMLSchema"
    elementFormDefault="qualified"
    attributeFormDefault="unqualified">
    <xs:element name="join" type="join:join-session-id"/>
    <xs:complexType name="join-session-id">
        <xs:sequence>
            <xs:element name="session-id" type="join: Session" minOccurs="0" maxOccurs="1/">
                <xs:any namespace="##other" processContents="lax" minOccurs="0" maxOccurs="unbounded"/>
            </xs:sequence>
            <xs:anyAttribute namespace="##other"
            processContents="lax"/>
    </xs:complexType>
    <xs:complexType name="Session">
        <xs:sequence>
            <xs:any namespace="##other" processContents="lax" minOccurs="0" maxOccurs="unbounded"/>
        </xs:sequence>
        <xs:attribute name="call-id" type="xs:string"/>
        <xs:attribute name="lt" type="xs:string"/>
        <xs:attribute name="rt" type="xs:string"/>
        <xs:anyAttribute namespace="##other"
        processContents="lax"/>
    </xs:complexType>
</xs:schema>
```

A specific form is as follows:
Content-Type: application/vnd.3gpp.join+xml//type of the message body, indicating that the content of the message body is used to indicate the session information of the join session.

```
<?xml version="1.0"?>
<join xmlns="urn:3gpp:ns:imsiut:join">
    <session-id call-id=" a84b4c76e66710" lt="1928301774"
    rt="456887766"
/>//indicating the session identifier information of the join session
    </ati>
```

Any one of the above XML message bodies is a possible implementation mode.

Step 206: After the initiator SCC AS receives the 302 redirect response message, an invite message is sent to the controller SCC AS according to the 302 redirect response message.

In step 206, after receiving the 302 redirect response message, the initiator SCC AS, serving as a B2BUA, terminates sending of the 302 redirect response message to the initiator UE, sends, according to the indication information of the 302 redirect response message, an invite message to the address indicated by the contact header, writes the XML message body of the 302 redirect response message into the join header of the redirected invite message, with the source header and the target header unchanged, and replicates other relevant headers and message bodies in the original invite message to the redirected invite message.

Steps 207-217: The controller SCC AS receives from the initiator UE an invite message that indicates requesting media transfer in a pull mode, and the controller SCC AS transfers, according to the target UE identifier, initiator UE identifier, and converted session identifier information in the pull mode media transfer request, the media to be transferred from the target UE to the initiator UE.

The controller SCC AS that receives the invite message identifies, according to the content-disposition/subject message header, that the message is a pull mode media transfer request, and judges, according to the session identifier information and the collaborative session information stored by the controller SCC AS, that the controller SCC AS is the controller SCC AS in the collaborative session in which the media to be transferred is involved.

The controller SCC AS judges, according to the initiator UE identifier in the source header of the invite message and the collaborative session information stored by the controller SCC AS, whether the initiator UE is in the current collaborative session, performs the corresponding media transfer operation, and when the initiator UE is not in the collaborative session, an operation associating with the collaborative session information is as follows:

Step 207: Before performing the media transfer operation, the controller SCC AS may authenticate with the controller UE whether the sender UE is allowed to send a pull mode media transfer request; when receiving from the controller UE a message indicating that the initiator UE is allowed to initiate a pull mode media transfer request, performs the subsequent step; if the controller UE does not allow the initiator UE to initiate a pull mode media transfer request, a failure response is returned, for example, a 4** failure response message.

Step 208: When the initiator UE is allowed to transfer the media on the target UE to the initiator UE after successful authentication, the controller SCC AS sends a re-invite (re-invite) message to the remote end to update the remote end, so that the corresponding media is communicated between the initiator UE and the remote end.

Step 209: The remote end returns a 200 ok response message.

Steps 210-213: The controller SCC AS returns a 200 ok response message with respect to the invite message to the initiator UE through the initiator SCC AS according to the information returned by the remote end, and completes negotiation of transferred media, and the initiator UE returns an ACK message with respect to the 200 ok message to the controller SCC AS through the initiator SCC AS.

Further, when the controller SCC AS returns the 200 ok response message with respect to the invite message to the initiator UE, the controller SCC AS may send a notification message to the initiator SCC AS to notify the initiator SCC AS that: the newly created session belongs to the current collaborative session; the corresponding UE is a controllee UE; and the SCC AS belongs to the SCC AS that the controllee UE belongs to.

The notification message may further include main information about the collaborative session, such as address or identity information of the controller UE and controller SCC AS, and so on.

The above information may be carried by the XML message body of the 200 ok response message; the initiator SCC AS identifies the message, and deletes the message body after storing the content information of the message body, and the 200 ok response message continues to be sent to the initiator UE.

Step 214: The controller SCC AS returns an ACK message with respect to the 200 ok response message to the remote end.

Steps 215-216: The controller SCC AS updates the target UE in which the media is involved, and releases the media transferred to the initiator UE from the target UE.

Step 217: The controller SCC AS updates the collaborative session information stored by the controller UE, that is, the UE in which the transferred media is involved is changed from the target UE to the initiator UE.

In actual applications, if the initiator UE that sends the invite message and the target UE belong to the same subscription and the same SCC AS, the invite message is directly sent to the target SCC AS that the target UE belongs to according to the target header of the invite message; the target SCC AS knows, by judging the source header, that the initiator UE that sends the invite message belongs to the current target SCC AS, and may not send a 302 redirect response message, but directly sends the invite message to the controller SCC AS that the controller UE belongs to in the collaborative session.

This embodiment provides a procedure in which the UE outside the collaborative session uses the invite message to request the controllee UE in the collaborative session to transfer media; in the collaborative session, the controllee UE and the controller UE belong to different subscriptions; the controllee SCC AS sends the pull mode media transfer request to the controller SCC AS after receiving the pull mode media transfer request, and the controller SCC AS completes the media transfer process. The technical solution ensures the reliability of media transfer between the UEs.

Embodiment 3

Figure 3:
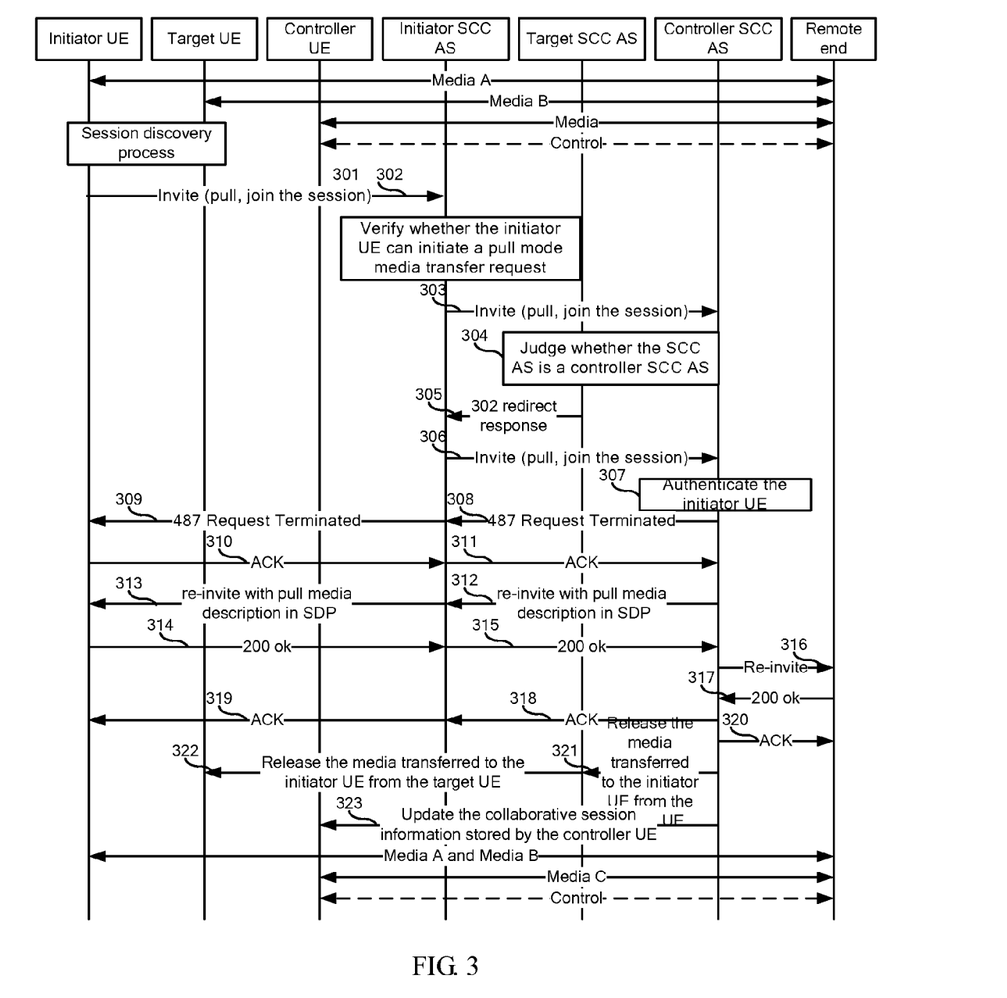
FIG. 3 is a signaling flowchart of a method for media transfer between user equipment according to a third embodiment of the present invention.

FIG. 3 is a signaling flowchart of a method for media transfer between user equipment according to a third embodiment of the present invention. A case that this embodiment is applicable to is as follows: The created collaborative session includes a controller UE and more than two controllee UEs. This embodiment takes two controllee UEs as an example, that is, the first controllee UE and the second controllee UE, and the three UEs belong to different subscriptions, and the first controllee SCC AS, the second controllee SCC AS, and the controller SCC AS are different SCC ASs. The embodiment specifically is a solution for the second controllee UE to request to transfer the media on the first controllee UE to the second controllee UE; the second controllee UE serves as an initiator UE; the first controllee UE serves as a target UE; and an invite message is used as a pull mode media transfer request.

In this embodiment, similar to the second embodiment, the initiator UE may still discover the information about the sessions and media on other UEs through the session discovery process, and accordingly decides to request to transfer one or multiple pieces of media on the target UE to the initiator UE. The initiator UE does not know that the initiator UE itself is the controllee UE in the collaborative session, and cannot know, through the session discovery process, that the initiator UE and the target UE belong to the same collaborative session. Therefore, the second controllee UE still initiates a pull mode media transfer request as in the second embodiment, and the media transfer method includes the following steps:

Steps 301-306 are basically the same as steps 201-206 in the second embodiment. The second controllee UE serving as an initiator UE initiates an invite message to create a signaling connection for media transfer, where the invite message at least includes an initiator UE identifier, a target UE identifier, the session identifier information between the target UE and the target SCC AS, and the media to be transferred; and the media to be transferred is one or multiple pieces of media on the target UE. The invite message is sent to the controller SCC AS. The setting formats of the headers and message bodies of the invite message are the same as those in the second embodiment, which is not described in detail again here.

Steps 307-323: The controller SCC AS transfers, according to the target UE identifier, initiator UE identifier, and converted session identifier information in the pull mode media transfer request, the media to be transferred from the target UE to the initiator UE.

The controller SCC AS judges, according to the content-disposition/subject message header of the invite message, that the invite message is a pull mode media transfer request, and knows, according to the session identifier information in the join header, that the controller SCC AS is a controller SCC AS in the collaborative session; the controller SCC AS judges, according to the initiator UE identifier in the source header of the invite message and the collaborative session information stored by the controller SCC AS, whether the initiator UE is in the current collaborative session; if not, steps 207-217 in the second embodiment may be performed; and if so, the controller SCC AS adds media to be transferred in the original access leg corresponding to the initiator UE in the current collaborative session, so that the signaling information of all media on the initiator UE is transmitted in the same access leg.

Because the initiator UE already belongs to the collaborative session in this embodiment, the media transfer performed by the controller SCC AS differs from that in the second embodiment, and a specific procedure is as follows:

Step 307: The controller SCC AS initiates a request for authenticating the initiator UE to the controller UE, and receives a returned result indicating whether the authentication is allowed, and if the authentication is allowed, proceeds to the following steps:

Steps 308-309: The controller SCC AS returns a termination response with respect to the invite message to the initiator UE, such as a 487 response message (487 Request Terminated), and the response is forwarded to the initiator UE through the initiator SCC AS, so as to terminate the invite message.

Steps 310-311: The initiator UE returns an ACK message with respect to the final response message of the controller SCC AS through the initiator SCC AS.

Steps 312-313: The controller SCC AS searches for the original access leg corresponding to the initiator UE in the current collaborative session, sends a re-invite message in the original access leg of the initiator UE, and adds media to be transferred in the re-invite message, and specifically, may add media lines to be transferred (re-invite with pull media description in SDP) in the SDP message body of the re-invite message. The re-invite message is sent to the initiator UE through the initiator SCC AS, so as to add media to be transferred to the initiator UE.

Steps 314-315: The initiator UE returns a 200 ok response message with respect to the re-invite message through the initiator SCC AS, where the response message carries media description information such as the port number allocated by the initiator UE to the media to be transferred.

Steps 316-317: The controller SCC AS sends a re-invite message to the remote end according to the description information of the transferred media returned by the initiator UE, so as to update the remote end, and the remote end returns a 200 ok response message.

Steps 318-319: The controller SCC AS returns an ACK message with respect to the 200 ok response message to the initiator UE.

Step 320: The controller SCC AS returns an ACK message with respect to the 200 ok response message to the remote end.

Steps 321-322: The controller SCC AS updates the target UE in which the media is involved, and releases the media transferred to the initiator UE from the target UE.

Step 323: The controller SCC AS updates the collaborative session information stored by the controller UE, that is, changes the UE in which the transferred media is involved from the first controllee UE to the second controllee UE.

If the initiator UE and the target UE belong to the same subscription and the same SCC AS, the pull mode media transfer request may be directly sent to the first controllee SCC AS; the first controllee SCC AS knows, through the above judgment process, that the request is sent by the UE that belongs to the first controllee SCC AS, and therefore, does not need to return a 302 redirect response message but directly forwards the invite message to the controller SCC AS.

When a controllee UE initiates a pull mode media transfer request to other controllee UEs in the collaborative session, even if the initiator UE is in the collaborative session, the media transfer method of the second embodiment may also be used, that is, the session newly created by the initiator UE is not terminated, so that the initiator UE has two access legs in the collaborative session. The two access legs enable the UE to transmit different media streams in different session networks, for example, if the controllee UE requests to transfer video media, access legs of the video media are set up in the packet-switched access network with wider channel bandwidth, so as to facilitate transmission of media streams. The specific implementation process is described in the second embodiment.

This embodiment provides a solution for the controllee UE in the collaborative session to request other controllee UEs in the collaborative session to transfer media. The initiator UE initiates a pull mode media transfer request outside the collaborative session; the target SCC AS receives the pull mode media transfer request, and sends the pull mode media transfer request to the controller SCC AS, and the controller SCC AS completes the media transfer process. After receiving the pull mode media transfer request, the controller SCCAS judges whether the initiator UE belongs to the collaborative session, and performs different processing methods; or, for the initiator UE that belongs to the collaborative session, media transfer may also be performed according to the method for initiating a pull mode media transfer request outside the collaborative session. The technical solution of this embodiment ensures the reliability of media transfer between the UEs.

Embodiment 4

Figure 4:
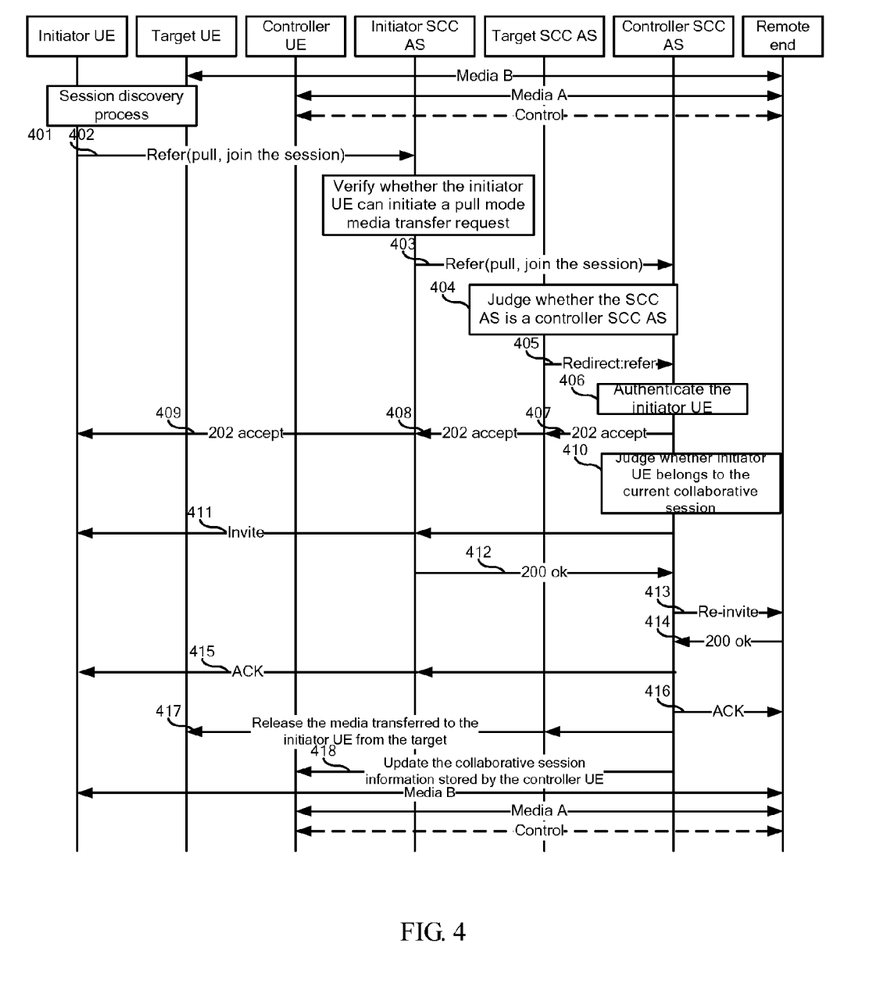
FIG. 4 is a signaling flowchart of a method for media transfer between user equipment according to a fourth embodiment of the present invention.

FIG. 4 is a signaling flowchart of a method for media transfer between user equipment according to a fourth embodiment of the present invention. This embodiment may be based on the case of the second embodiment, but differs from the second embodiment in that the initiator UE may belong or not belong to the current collaborative session, and a refer (refer) message is used as a pull mode media transfer request in this embodiment. The initiator UE, target UE, and controller UE belong to different subscriptions and different SCC ASs. The initiator UE discovers information about the session and media on other UEs through the session discovery process, and transfers one or multiple pieces of media on the target UE to the initiator UE according to the obtained session information of the target UE, where the target UE is the controllee UE in the collaborative session.

Step 401: The initiator UE initiates a refer message to transfer the media on the target UE to the initiator UE itself, where the refer message at least includes an initiator UE identifier, a target UE identifier, the session identifier information between the target UE and the target SCC AS, and the media to be transferred, and the media to be transferred is one or multiple pieces of media on the target UE.

Multiple headers and message bodies of the refer message may be used to indicate the above information. The specific headers are introduced as follows:

Refer-to (refer-to) header: Because it is required to transfer the media to the initiator UE, the transfer-to header records the initiator UE indication, that is, the identity information of the initiator UE itself (may include a globally routable user agent URI, (Globally Routable User Agent URI, GRUU for short)). The type of media to be transferred by the initiator UE may be included in the refer-to header, and serve as a type of media that needs to be created on the initiator UE itself. For example, in "Refer-to: <target-URI; GRUU; audio; video; >", "audio" and "video" indicate creating audio and video media on the UE specified by the refer-to header. Or the media type may also be carried by a message body, for example, the transfer-to header carries SDP information or the invite message carries an XML message body, to indicate the media to be transferred. The method (method) item in the refer-to header may be set to "invite (invite)".

The target-dialog (target-dialog) header is used to record the session identifier information of the target UE in which the media to be transferred is involved, and is functionally equivalent to the join header in the invite message. To differentiate from separate creation of a session after media transfer, the initiator UE may instruct the controller SCC AS to join the collaborative session after transfer, and the initiator UE enhances the refer-to header of the refer message to reflect the instruction information. The target UE URI of the refer-to header may further carry the capability information or feature information of the target UE, for example, the following setting may be performed according to RFC 3840:

Method 1: In "sip: actor", "attendant" may be used to indicate joining the session pointed to by the target-dialog header, and "principal" indicates creating a new IMS session separately.

Method 2: "sip: events=session" indicates creating a session, but gives no special indication for joining the collaborative session; a network side creates a session only after receiving the "events=session" indication, otherwise, indicates joining the session after media transfer.

The specific form is "Refer-To: sip: conf44@example.com; principal (attendant)/session."

Target header and source header: The source header is the identity information of the initiator UE, for example, "From: initiator UE URI", and the target header is the identity information of the target UE, for example, "To: controllee UE URI". Though parameters of the target header and request-URI header are consistent, the parameters have different identification functions when being parsed and identified.

Request uniform resource identifier (request-URI) header: indicates the destination to which the refer message is sent. When the pull mode media transfer request is initiated, the destination address is the target UE identifier.

In actual applications, multiple types of parameters may be used to identify that the refer message is a pull mode media transfer request, for example, the refer message is identified as a pull mode media transfer request through a same value of the source header and refer-to header, or through a subject (subject) header, such as "subject: pull-media". If the refer message includes a message body, the refer message is identified as a pull mode media transfer request through "content-dispositon" such as "content-dispositon: pull-media".

Step 402: The refer message is sent to the SCC AS that the initiator UE belongs to through the S-CSCF; the initiator SCC AS may first verify, when judging that the refer message requests media transfer in a pull mode, whether the initiator UE is allowed to initiate a pull mode media transfer request; if yes, proceeds to the subsequent step; and if the initiator UE is not allowed to initiate a pull mode media transfer request, returns a "4** response message" with respect to the refer message.

The SCC AS that receives the refer message judges, according to the destination address in the refer message, whether the SCC AS is the destination of the refer message; if yes, because the request is a pull mode media transfer request, the SCC AS terminates sending to the target UE and proceeds to step 404; and if not, the pull mode media transfer request is continued to be sent according to the destination address, and step 403 is performed.

Step 403: This step is similar to step 402; and the target SCC AS that the target UE belongs to receives the refer message.

Step 404: The target SCC AS terminates sending of the refer message to the target UE when identifying that the refer message is a pull mode media transfer request, and judges, according to the session identifier information in the target-dialog header of the refer message and the stored information about the collaborative session, whether the target SCC AS is a controller SCC AS in the collaborative session in which the media to be transferred is involved; if yes, the target SCC AS may serve as a controller UE to perform the media transfer operation; and if not, step 405 is performed.

Further, before the target SCC AS performs subsequent judgment logic after judging that the received refer message is a pull mode media transfer request, the target SCC AS may also authenticate with the target UE whether the initiator UE is allowed to initiate a pull mode media transfer request to the target UE.

Step 405: The target SCC AS converts the session identifier information included in the refer message into the session identifier information between the target SCC AS and the controller SCC AS, and forwards the refer message to the controller SCC AS (redirect: refer), so that the controller SCC AS performs media transfer according to the invite message.

The target SCC AS forwards the converted refer message to the controller SCC AS.

For conversion of the session identifier information, specifically, the session identifier information of the target-dialog header may be replaced with the session identifier information between the target SCC AS and the controller SCC AS, so that the controller SCC AS finds the matched session according to the target-dialog header and performs a media transfer operation according to the initiator UE and the target UE identifier.

To send the refer message to the controller SCC AS, the following processing may be performed on the refer message:

The target UE URI of the request uniform resource identifier header is replaced with a controller SCC AS PSI, with the source header and the target header unchanged, and other headers and message bodies are replicated. The controller SCC AS PSI is similar to the controller UE identifier, and both are used to identify a certain entity.

Steps 406-418: The controller SCC AS receives the refer message, parses the target-dialog header in the refer message, and judges, according to the collaborative session information stored by the controller SCC AS, that the controller SCC AS is a controller SCC AS in a target session which is a collaborative session therefore, the controller SCC AS transfers, according to the target UE identifier, initiator UE identifier, and converted session identifier information in the pull mode media transfer request, the media to be transferred from the target UE to the initiator UE. The specific procedure is as follows:

Step 406: The controller SCC AS may send a transfer authentication request to the controller UE, so as to request the controller UE to authenticate whether the initiator UE is allowed to initiate a pull mode media transfer request; when the controller UE allows the initiator UE to initiate a pull mode media transfer request, returns an accept response message with respect to the pull mode media transfer request, for example, a "202 accept" response message; if the controller UE does not allow the initiator UE to initiate a pull mode media transfer request, the controller SCC AS returns a failure response, for example, a 4** failure response message. Here, it is assumed that the controller UE allows the initiator UE to initiate a pull mode media transfer request in this step.

Steps 407-409: The controller SCC AS accepts the pull mode media transfer request, and returns a transfer accept response (202 accept) to the initiator UE.

Step 410: The controller SCC AS judges, according to the initiator UE identifier in the source header and the session identifier information in the target-dialog header of the refer message, and the collaborative session information stored by the controller SCC AS, whether the initiator UE belongs to the current collaborative session; if yes, step 411 is performed; and if not, the controller SCC AS adds media on the original access leg corresponding to the initiator UE in the current collaborative session, and completes the media transfer process.

Step 411: The controller SCC AS initiates an invite message to the initiator UE according to the type of the media to be transferred that is as indicated in the pull mode media transfer request, so as to create a new session between the initiator UE and the controller SCC AS and create media to be transferred in the new session.

The SDP message body of the invite message carries the port number of the remote end of the corresponding media and media description information.stored by the controller SCC AS.

Further, the controller SCC AS may carry notification information in the invite message, so as to instruct the initiator SCC AS that: the created session belongs to the current collaborative session; the corresponding initiator UE is a controllee UE; and the initiator SCC AS is a controllee SCC AS.

The notification information may further include main information about the collaborative session, such as address or identity information of the controller UE and controller SCC AS, and so on.

The above information may be carried by the XML message body of the invite message; the initiator SCC AS identifies the invite message, deletes the message body after storing the content information of the message body of the invite message, and continues to send the invite message to the initiator UE.

Step 412: The initiator UE returns a 200 ok response message through the initiator SCC AS.

Steps 413-414: The controller SCC AS sends a re-invite message to the remote end, and updates the connection of the remote end; and the remote end returns a 200 ok response message.

Step 415: The controller SCC AS returns an ACK message with respect to the 200 ok response message to the initiator UE through the initiator SCC AS.

Step 416: The controller SCC AS returns an ACK message to the remote end, and completes the process of media negotiation between the initiator UE and the remote end.

Step 417: The controller SCC AS updates the information about the media on the source UE in which the transferred media is involved, and releases the media that is transferred to the initiator UE from the target UE.

Step 418: The controller SCC AS updates the collaborative session information stored by the controller UE, that is, changes the UE of the transferred media from the target UE to the initiator UE.

In this embodiment, when the initiator UE and the target UE belong to the same subscription and the same SCC AS, the procedure is similar to the above process, and the refer request may be directly sent to the controller SCC AS through the SCC AS.

If the initiator UE is the controllee UE in the collaborative session, the process of transferring media to other controllee UEs in the collaborative session in a pull mode is similar to the above process, and the difference lies in that in step 410, media on the initiator UE is created on the existing signaling connection of the initiator UE through a re-invite message, and the controller SCC AS does not need to carry an XML message body indicating that the initiator SCC AS is a controllee SCC AS.

This embodiment provides a method for the initiator UE to request the controllee UE in the collaborative UE to transfer media through a refer message, and the initiator UE may belong to or not belong to the collaborative session. The controllee SCC AS sends the refer message to the controller SCC AS in the collaborative session after receiving the refer message, and the controller SCC AS performs the media transfer process. The technical solution of this embodiment ensures the reliability of media transfer between the UEs.

Embodiment 5

A fifth embodiment of the present invention provides a method for media transfer between user equipment, specifically, the method performed by the initiator UE, including the following steps:

The initiator UE initiates a pull mode media transfer request to the target UE, where the pull mode media transfer request includes session identifier information, and the session identifier information is used to identify the session in which the media to be transferred on the target UE is involved. The session identifier information is used to, when the target SCC AS receives the pull mode media transfer request, if the session in which the media to be transferred is involved is a collaborative session, and it is judged, according to the session identifier information, that the target SCC AS is a controllee SCC AS in the collaborative session in which the media to be transferred is involved, the target SCC AS forwards the pull mode media transfer request to the controller SCC AS in the collaborative session so that the controller SCC AS performs media transfer, where the target SCC AS is the SCC AS that the target UE belongs to, and the controller SCC AS is the SCC AS that the controller UE in the collaborative session belongs to.

The UE may use different messages as the pull mode media transfer request. One mode is that the initiator UE uses an invite message as the pull mode media transfer request, and the pull mode of the media transfer request is indicated by the message header in the invite message. Another mode is that the initiator UE uses the refer message as the pull mode media transfer request, and a header is used in the refer message to instruct the initiator UE to join the current collaborative session after completing media transfer in pull mode. For a specific application instance, reference may be made to the description of the above embodiments.

The method provided in this embodiment may be used in conjunction with the method performed by the SCC AS provided by the present invention to implement the media transfer operation between UEs.

Embodiment 6

Figure 5:
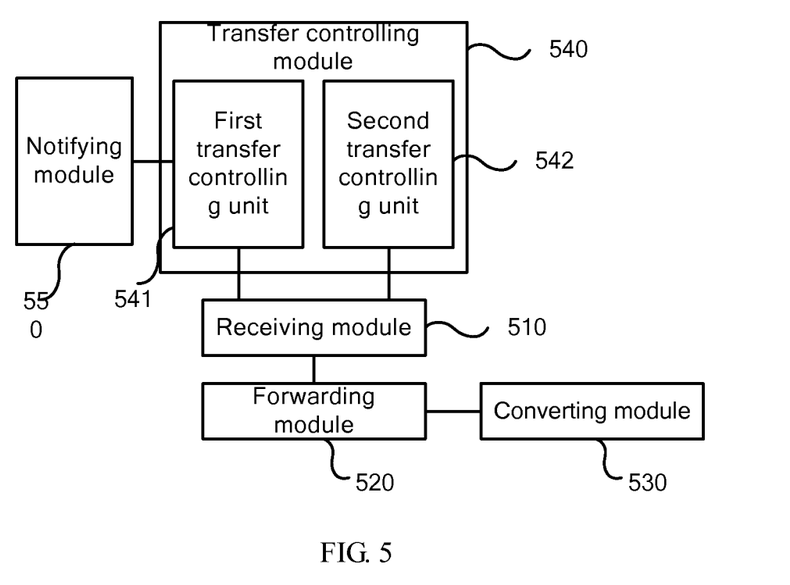
FIG. 5 is a schematic structure diagram of a continuity application server according to a sixth embodiment of the present invention.

FIG. 5 is a schematic structure diagram of a continuity application server according to a sixth embodiment of the present invention, which specifically includes a receiving module 510 and a forwarding module 520. The receiving module 510 is configured to receive a pull mode media transfer request initiated by an initiator UE to a target UE, where the pull mode media transfer request includes session identifier information, and the session identifier information is used to identify a session in which media to be transferred on the target UE is involved. The forwarding module 520 is configured to forward, when the session in which the media to be transferred is involved is a collaborative session and when it is judged, according to the session identifier information, that the SCC AS is a controllee SCC AS in the collaborative session of the media to be transferred, the pull mode media transfer request to a controller SCC AS in the collaborative session, so that the controller SCC AS performs media transfer, where the controller SCC AS is an SCC AS of a controller UE in the collaborative session.

The SCC AS may further include a converting module 530, which is configured to convert, when it is judged that the SCC AS itself is not a controller SCC AS in the collaborative session of the media to be transferred, the session identifier information included in the pull mode media transfer request into the session identifier information between the SCC AS and the controller SCC AS.

The pull mode media transfer request may be implemented by using multiple types of messages. When the pull mode media transfer request is an invite message, the forwarding module specifically includes: a redirecting unit, configured to redirect the invite message to the controller SCC AS when it is judged that the initiator UE does not belong to the SCC AS.

When the SCC AS in this embodiment serves as a controller SCC AS, the SCC AS may further include a transfer controlling module 540, which is configured to transfer media according to the pull mode media transfer request when it is judged, according to the pull mode media transfer request, that the SCC AS is the controller SCC AS in the collaborative session in which the media to be transferred is involved.

The transfer controlling module 540 may specifically include: a first transfer controlling unit 541 and/or a second conversion controlling unit 542. The first transfer controlling unit 541 is configured to create a session with the initiator UE, and create media to be transferred in the newly created session. The second conversion controlling unit 542 is configured to add, when it is judged that the initiator UE is in the current collaborative session, media to be transferred in the original access leg of the initiator UE in the current collaborative session.

When serving as a controller SCC AS, the SCC AS may further include a notifying module 550, which is connected to the first conversion controlling unit 541 and configured to send a notification message to the initiator SCC AS, so as to notify that the newly created session belongs to the current collaborative session and that the initiator UE is a controllee UE, and notify the information about the controller UE and/or information about the controller SCC AS.

An embodiment of the present invention further provides a user equipment, including a request initiating module, configured to initiate a pull mode media transfer request to a target UE, where the pull mode media transfer request includes session identifier information, and the session identifier information is used to identify a session in which the media to be transferred on the target UE is involved. The session identifier information is used to, when a target SCC AS receives the pull mode media transfer request, if the session in which the media to be transferred is involved is a collaborative session, and it is judged, according to the session identifier information, that the target SCC AS is a controllee SCC AS in the collaborative session in which the media to be transferred is involved, the target SCC AS forwards the pull mode media transfer request to a controller SCC AS in the collaborative session, so that the controller SCC AS performs media transfer, where the target SCC AS is the SCC AS that the target UE belongs to, and the controller SCC AS is the SCC AS that the controller UE in the collaborative session belongs to.

An embodiment of the present invention further provides a system for media transfer between user equipment, which includes a target SCC AS and a controller SCC AS.

The target SCC AS is configured to: receive a pull mode media transfer request initiated by an initiator UE to a target UE, where the target SCC AS is the SCC AS that the target UE belongs to, and the pull mode media transfer request includes session identifier information, and the session identifier information is used to identify a session in which the media to be transferred on the target UE is involved; and when the session in which the media to be transferred is involved is a collaborative session and the target SCC AS judges, according to the session identifier information, that the target SCC AS is a controllee SCC AS in the collaborative session, forward the pull mode media transfer request to the controller SCC AS in the collaborative session.

The controller SCC AS is configured to transfer media when it is judged, according to the session identifier information of the session in which the media to be transferred is involved that is as indicated in the received pull mode media transfer request, that the controller SCC AS is a controller SCC AS in the collaborative session in which the media to be transferred is involved.

The user equipment, continuity application server, and system provided by the embodiments of the present invention may perform the method for media transfer between user equipment according to the embodiments of the present invention, and have corresponding function modules. The technical solutions in the embodiments of the present invention solve a problem that, in the prior art, the initiator UE cannot request the controllee UE in the collaborative session to transfer media when the target controllee UE and the controller UE do not belong to the same SCC AS.

It should be noted that, the controller SCC AS involved in the embodiments of the present invention includes but is not limited to at least one of the following:

an SCC AS that a controller UE belongs to or a controller SCC AS for managing all session legs of the collaborative session, that is, a Hosting SCC AS.

Persons of ordinary skill in the art may understand that all or a part of the steps of the method embodiments may be implemented by a program instructing relevant hardware. The program may be stored in a computer readable storage medium. When the program is run, the steps of the method embodiments are performed. The storage medium may be any medium that is capable of storing program codes, such as a ROM, a RAM, a magnetic disk, or an optical disk.

Finally, it should be noted that the above embodiments are merely provided for describing the technical solutions of the present invention, but not intended to limit the present invention. Although the present invention has been described in detail with reference to the foregoing embodiments, persons of ordinary skill in the art should understand that, modifications may still be made to the technical solutions described in the foregoing embodiments, or equivalent substitutions may be made to some technical features in the technical solutions, and these modifications or substitutions do not cause the essence of corresponding technical solutions to depart from the spirit and scope of the technical solutions of present invention.

What is claimed is:

1. A target continuity application server for transferring media from a target user equipment to an initiator user equipment, comprising:
    a receiver device configured to receive a pull mode media transfer request initiated by the initiator user equipment, wherein the pull mode media transfer request comprises session identifier information that identifies a session associated with media to be transferred that is on the target user equipment, wherein the target continuity application server is the server to which the target user equipment belongs; and
    a transmitter device configured to forward, when the session associated with the media to be transferred is a collaborative session and the target continuity application server determines itself to be a controllee continuity application server according to the ession identifier information, the pull mode media transfer request to a controller continuity application server that performs media transfer; wherein:
    the controllee continuity application server is a continuity application server to which a controllee user equipment in the collaborative session belongs, and
    the controller continuity application server is a continuity application server to which a controller user equipment in the collaborative session belongs.

2. The target continuity application server according to claim 1, further comprising:
    a converter device configured to convert the session identifier information included in the pull mode media transfer request into session identifier information between the target continuity application server and the controller continuity application server when the target continuity application server is not a controller continuity application server in the collaborative session.

3. The target continuity application server according to claim 1, further comprising:
    a transfer controller configured to perform media transfer according to the pull mode media transfer request when upon determining that, according to the pull mode media transfer request, the target continuity application server is a controller continuity application server in the collaborative session.

4. The target continuity application server according to claim 3, wherein the transfer controller comprises at least one of the following units:
    a first transfer controller configured to create a session with the initiator user equipment, and create the media to be transferred in the newly created session; and
    a second conversion controller configured to add the media to be transferred in an original access leg of the initiator user equipment in the current collaborative session when it is determined that the initiator user equipment is in the current collaborative session.

5. The target continuity application server according to claim 1, wherein the pull mode media transfer request is an invite message, and the converter device comprises a redirector configured to redirect the invite message to the controller continuity application server when it is determined that the initiator user equipment does not belong to the target continuity application server.

6. A method for transferring media from a target user equipment to an initiator user equipment, comprising:
    receiving, by a target continuity application server to which the target user equipment belongs, a pull mode media transfer request initiated by the initiator user equipment, wherein the pull mode media transfer request comprises session identifier information that identifies a session associated with media to be transferred that is on the target user equipment;
    determining, by the target continuity application server, whether the target continuity application server is a controllee continuity application server according to the session identifier information; and
    when the session associated with the media to be transferred is a collaborative session and the target continuity application server is determined to be a controllee continuity application server, forwarding, by the target continuity application server, the pull mode media transfer request to a controller continuity application server that performs the media transfer, wherein:
    the controllee continuity application server is a continuity application server to which a controllee user equipment in the collaborative session belongs, and
    the controller continuity application server is a continuity application server to which a controller user equipment in the collaborative session belongs.

7. The method for transferring media according to claim 6, further comprising:
    creating, by the controller continuity application server, a session with the initiator user equipment, and creating the media to be transferred in the newly created session.

8. The method for transferring media according to claim 7, wherein:
    creating the session comprises sending, by the controller continuity application server, a notification message to an initiator continuity application server to notify that the created session belongs to the current collaborative session and that the initiator user equipment is a controllee user equipment, and notify information about the controller user equipment and/or information about the controller continuity application server.

9. The method for transferring media according to claim 6, further comprising:
adding the media to be transferred in an original access leg of the initiator user equipment in the current collaborative session when the controller continuity application server judges that the initiator user equipment is in the current collaborative session.

10. The method for transferring media according to claim 9, wherein the adding step comprises, when the pull mode media transfer request is an invite message:
returning, by the controller continuity application server, a termination response with respect to the invite message to the initiator user equipment to terminate the invite message; and
sending, by the controller continuity application server, a re-invite message to the initiator user equipment to request to add the media to be transferred in the original access leg of the initiator user equipment in the current collaborative session.

11. The method for transferring media according to claim 6, wherein forwarding the pull mode media transfer request comprises:
converting, by the target continuity application server, the session identifier information included in the pull mode media transfer request into session identifier information between the target continuity application server and the controller continuity application server.

12. The method for transferring media according to claim 6, wherein forwarding the pull mode media transfer request comprises:
when the pull mode media transfer request is an invite message and the target continuity application server judges that the initiator user equipment does not belong to the target continuity application server, redirecting the invite message to the controller continuity application server.

13. The method for transferring media according to claim 12, wherein redirecting the invite message comprises:
returning a redirect message with respect to the invite message sent by the initiator user equipment, so as to directly send the invite message to the controller continuity application server, and carrying the session identifier information between the target continuity application server and the controller continuity application server in the redirect message to update the session identifier information in the invite message.

\* \* \* \* \*

UNITED STATES PATENT AND TRADEMARK OFFICE
CERTIFICATE OF CORRECTION

PATENT NO. : 9,531,816 B2  
APPLICATION NO. : 13/584371  
DATED : December 27, 2016  
INVENTOR(S) : Yi et al.

Page 1 of 1

It is certified that error appears in the above-identified patent and that said Letters Patent is hereby corrected as shown below:

In the Claims

Column 21, Line 54, "the ession" should read -- the session --.

Signed and Sealed this  
Eighteenth Day of April, 2017

Michelle K. Lee  
*Director of the United States Patent and Trademark Office*